United States Patent
Nguyen et al.

(10) Patent No.: US 11,405,917 B2
(45) Date of Patent: *Aug. 2, 2022

(54) ENABLING MULTI-CLUSTER TRANSMISSIONS

(71) Applicant: QUALCOMM INCORPORATED, San Diego, CA (US)

(72) Inventors: Tien Viet Nguyen, Bridgewater, NJ (US); Shailesh Patil, San Diego, CA (US); Zhibin Wu, Los Altos, CA (US); Sudhir Kumar Baghel, Hillsborough, NJ (US); Kapil Gulati, Hillsborough, NJ (US); Libin Jiang, Seattle, WA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/777,720

(22) Filed: Jan. 30, 2020

(65) Prior Publication Data

US 2020/0170017 A1 May 28, 2020

Related U.S. Application Data

(63) Continuation of application No. 15/646,861, filed on Jul. 11, 2017, now Pat. No. 10,595,315.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/003* (2013.01); *H04L 5/0039* (2013.01);
(Continued)

(58) Field of Classification Search
CPC ......... H04W 72/0453; H04W 72/0406; H04W 4/70; H04W 40/04; H04W 40/32;
(Continued)

(56) References Cited

U.S. PATENT DOCUMENTS 9,253,735 B2    2/2016 Coan et al.
2007/0019670 A1*  1/2007 Falardeau ............. H04W 48/18
                                            370/465
(Continued)

FOREIGN PATENT DOCUMENTS

CN    101932114 A    12/2010
CN    102625252 A    8/2012
(Continued)

OTHER PUBLICATIONS

International Search Report and Written Opinion—PCT/US2017/041639—ISA/EPO—dated Sep. 14, 2017.

*Primary Examiner* — Ajit Patel
*Assistant Examiner* — Wilfred Thomas
(74) *Attorney, Agent, or Firm* — Holland & Hart LLP

(57) ABSTRACT

Methods, systems, and devices for wireless communication are described. A user equipment (UE) may determine to use multi-cluster communications in a vehicle based communication network. The UE may identify a configuration parameter associated with the multi-cluster communications. The UE may select a cluster resource from a set of available cluster resources based on the configuration parameter. The cluster resource may include one or more clusters used for multi-cluster transmissions in the vehicle based communication network. The UE may transmit an indication of the selected cluster resource to a wireless node of the vehicle based communication network, for example, to another UE. The UE may transmit the multi-cluster transmission on the selected cluster resource.

30 Claims, 12 Drawing Sheets

Related U.S. Application Data

(60) Provisional application No. 62/364,042, filed on Jul. 19, 2016.

(51) Int. Cl.
*H04L 67/12* (2022.01)
*H04W 4/70* (2018.01)
*H04W 40/04* (2009.01)
*H04W 40/32* (2009.01)
*H04W 72/02* (2009.01)

(52) U.S. Cl.
CPC .......... *H04L 5/0044* (2013.01); *H04L 5/0091* (2013.01); *H04L 67/12* (2013.01); *H04W 4/70* (2018.02); *H04W 40/04* (2013.01); *H04W 40/32* (2013.01); *H04W 72/02* (2013.01); *H04W 72/0406* (2013.01); *H04W 72/0473* (2013.01); *H04L 5/0023* (2013.01)

(58) Field of Classification Search
CPC .......... H04W 72/02; H04W 72/0473; H04L 5/0044; H04L 5/0039; H04L 5/0091; H04L 5/003; H04L 67/12; H04L 5/0023; Y02D 30/70
See application file for complete search history.

(56) References Cited

U.S. PATENT DOCUMENTS

| | | | |
|---|---|---|---|
| 2009/0245159 A1* | 10/2009 | Oyman | H04B 7/2606 370/315 |
| 2009/0296680 A1* | 12/2009 | Suzuki | H04W 72/0406 370/342 |
| 2012/0257530 A1* | 10/2012 | Bijwaard | H04W 72/1231 370/252 |
| 2013/0329631 A1* | 12/2013 | Alam | H04W 52/50 370/328 |
| 2014/0269601 A1 | 9/2014 | Sage et al. | |
| 2015/0195827 A1 | 7/2015 | Feng et al. | |
| 2015/0296411 A1* | 10/2015 | Meyer | H04W 4/46 370/336 |
| 2016/0212596 A1* | 7/2016 | Brahmi | H04W 72/042 |
| 2016/0295624 A1* | 10/2016 | Novlan | H04W 72/04 |
| 2017/0338986 A1* | 11/2017 | He | H04L 27/2636 |
| 2018/0027563 A1 | 1/2018 | Nguyen et al. | |

FOREIGN PATENT DOCUMENTS

| | | |
|---|---|---|
| CN | 105453679 A | 3/2016 |
| EP | 2773155 A1 | 9/2014 |
| KR | 20150128285 A | 11/2015 |
| WO | WO-2014055684 | 4/2014 |
| WO | WO-2015085561 A1 | 6/2015 |

* cited by examiner

ENABLING MULTI-CLUSTER TRANSMISSIONS

CROSS REFERENCES

The present Application for Patent is a Continuation of U.S. patent application Ser. No. 15/646,861 by Nguyen et al., entitled "Enabling Multi-Cluster Transmissions" filed Jul. 11, 2017, which claims priority to U.S. Provisional Patent Application No. 62/364,042 by Nguyen et al., entitled "Enabling Multi-Cluster Transmissions," filed Jul. 19, 2016, both of which are assigned to the assignee hereof and expressly incorporated by reference herein in their entirety.

BACKGROUND

The following relates generally to wireless communication, and more specifically to multi-cluster transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless communication systems may be used for vehicle based communication networks, also referred to as vehicle-to-everything (V2X), vehicle-to-vehicle (V2V) networks, and/or cellular V2X (C-V2X) networks. Vehicle based communication networks may provide always-on telematics where UEs, e.g., vehicle UEs (v-UEs), communicate directly to the network (V2N), to pedestrian UEs (V2P), to infrastructure devices (V2I), and to other v-UEs. The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

In some examples, vehicle based communication networks may be synchronous networks, which may support frequency division multiplexing (FDM) between transmissions by different v-UEs. This may support concentration of the transmission power on part of the bandwidth, and therefore increase link budget, or equivalently, extend communication range. Some areas (e.g., regions, countries, etc.) and/or network operators may predetermine some usage parameters (e.g., a transmit power or power spectral density (PSD)). Such predetermined usage parameters, however, may limit or reduce some advantages of vehicle based communication networks.

SUMMARY

The described techniques relate to improved methods, systems, devices, or apparatuses that support multi-cluster transmissions. Generally, the described techniques provide for a user equipment (UE), such as a vehicle UE (v-UE) of a vehicle based communication network, to perform communications using multi-cluster transmissions. For example, the UE may determine to use multi-cluster communications based at least in part on an operating region of the UE, a signaling received from a base station, etc. The UE may identify a configuration parameter for the multi-cluster communications. The configuration parameter may indicate that all or a portion of an available bandwidth for communications has been subdivided into clusters having the same size, i.e., each cluster may have the same number of resource blocks (RBs). Each available cluster may be associated with cluster resources. The UE may select a cluster resource from the available cluster resources (e.g., one or more clusters) and inform other nodes of the vehicle based communication network (e.g., other v-UEs, etc.) of the selected cluster resource. For example, the UE may transmit the indication of the selected cluster resource in a scheduling assignment message to the other wireless nodes. The cluster used for transmitting the scheduling assignment message may also include data (e.g., the cluster may use the first one, two, etc., RBs for the scheduling assignment information and the remaining RBs for data transmission). The UE may transmit the multi-cluster transmission using the selected cluster resource.

A method of wireless communication is described. The method may include determining to use multi-cluster communications in a vehicle based communication network, identifying a configuration parameter associated with the multi-cluster communications, selecting, based at least in part on the configuration parameter, a cluster resource from a set of available cluster resources, the cluster resource comprising one or more clusters used for a multi-cluster transmission in the vehicle based communication network, transmitting an indication of the selected cluster resource to at least one wireless node of the vehicle based communication network, and transmitting the multi-cluster transmission on the selected cluster resource.

An apparatus for wireless communication is described. The apparatus may include means for determining to use multi-cluster communications in a vehicle based communication network, means for identifying a configuration parameter associated with the multi-cluster communications, means for selecting, based at least in part on the configuration parameter, a cluster resource from a set of available cluster resources, the cluster resource comprising one or more clusters used for a multi-cluster transmission in the vehicle based communication network, means for transmitting an indication of the selected cluster resource to at least one wireless node of the vehicle based communication network, and means for transmitting the multi-cluster transmission on the selected cluster resource.

Another apparatus for wireless communication is described. The apparatus may include a processor, memory in electronic communication with the processor, and instructions stored in the memory. The instructions may be operable to cause the processor to determine to use multi-cluster communications in a vehicle based communication network, identify a configuration parameter associated with the multi-cluster communications, select, based at least in part on the configuration parameter, a cluster resource from a set of available cluster resources, the cluster resource comprising one or more clusters used for a multi-cluster transmission in the vehicle based communication network, transmit an indication of the selected cluster resource to at least one wireless node of the vehicle based communication network, and transmit the multi-cluster transmission on the selected cluster resource.

A non-transitory computer-readable medium for wireless communication is described. The non-transitory computer-readable medium may include instructions operable to cause a processor to determine to use multi-cluster communications in a vehicle based communication network, identify a configuration parameter associated with the multi-cluster communications, select, based at least in part on the configuration parameter, a cluster resource from a set of available cluster resources, the cluster resource comprising one or more clusters used for a multi-cluster transmission in the vehicle based communication network, transmit an indication of the selected cluster resource to at least one wireless node of the vehicle based communication network, and transmit the multi-cluster transmission on the selected cluster resource.

Some examples of the method, apparatus, and non-transitory computer-readable medium described above may further include processes, features, means, or instructions for identifying a transmission power requirement associated with the vehicle based communication network when there may be communications with a cellular communications network, wherein the determining to use the multi-cluster communications may be based at least in part on the identified transmission power requirement.

In some examples of the method, apparatus, and non-transitory computer-readable medium described above, the transmission power requirement may be based at least in part on a parameter obtained from a base station.

Some examples of the method, apparatus, and non-transitory computer-readable medium described above may further include processes, features, means, or instructions for identifying a transmission power requirement associated with the vehicle based communication network based at least in part on a location parameter of the UE when there may be a failure to communicate with a cellular communications network, wherein the determining to use the multi-cluster communications may be based at least in part on the transmission power requirement.

Some examples of the method, apparatus, and non-transitory computer-readable medium described above may further include processes, features, means, or instructions for receiving a message from a base station that conveys an indication of the configuration parameter.

In some examples of the method, apparatus, and non-transitory computer-readable medium described above, the message may be received during a radio resource control (RRC) setup exchange.

In some examples of the method, apparatus, and non-transitory computer-readable medium described above, the indication of the configuration parameter identifies the set of available cluster resources.

In some examples of the method, apparatus, and non-transitory computer-readable medium described above, the indication of the configuration parameter may be received via a broadcast transmission from the base station.

In some examples of the method, apparatus, and non-transitory computer-readable medium described above, the set of available cluster resources comprises a plurality of clusters, wherein each cluster of the plurality of clusters comprise a common bandwidth parameter.

In some examples of the method, apparatus, and non-transitory computer-readable medium described above, each cluster of the plurality of clusters comprise a common resource block parameter.

Some examples of the method, apparatus, and non-transitory computer-readable medium described above may further include processes, features, means, or instructions for identifying the configuration parameter based at least in part on preconfigured information.

Some examples of the method, apparatus, and non-transitory computer-readable medium described above may further include processes, features, means, or instructions for accessing the preconfigured information based at least in part on the determining to use multi-cluster communications.

Some examples of the method, apparatus, and non-transitory computer-readable medium described above may further include processes, features, means, or instructions for ranking each cluster associated with the set of available cluster resources according to a received energy level associated with each cluster. Some examples of the method, apparatus, and non-transitory computer-readable medium described above may further include processes, features, means, or instructions for selecting the cluster resource from a subset of available clusters based at least in part on the ranking for each cluster.

In some examples of the method, apparatus, and non-transitory computer-readable medium described above, the ranking of each cluster may be performed for a subframe.

Some examples of the method, apparatus, and non-transitory computer-readable medium described above may further include processes, features, means, or instructions for identifying a subset count identifying the number of clusters in the subset of available clusters being used for the multi-cluster transmission. Some examples of the method, apparatus, and non-transitory computer-readable medium described above may further include processes, features, means, or instructions for using at least one of an indication received from a base station or a preconfigured indication to select the cluster resource.

Some examples of the method, apparatus, and non-transitory computer-readable medium described above may further include processes, features, means, or instructions for transmitting a scheduling assignment (SA) message as the indication of the selected cluster resource. Some examples of the method, apparatus, and non-transitory computer-readable medium described above may further include processes, features, means, or instructions for transmitting a data message as the multi-cluster transmission.

In some examples of the method, apparatus, and non-transitory computer-readable medium described above, the SA message and the data message may be transmitted at different transmit power levels.

Some examples of the method, apparatus, and non-transitory computer-readable medium described above may further include processes, features, means, or instructions for transmitting the SA message and the data message at different transmit power levels based at least in part on a parameter received from a base station during a RRC setup procedure.

In some examples of the method, apparatus, and non-transitory computer-readable medium described above, the SA message and the data message may be transmitted at the same transmit power levels.

Some examples of the method, apparatus, and non-transitory computer-readable medium described above may further include processes, features, means, or instructions for transmitting the SA message and at least a portion of the data message in the same cluster.

Some examples of the method, apparatus, and non-transitory computer-readable medium described above may further include processes, features, means, or instructions for selecting the cluster resource for transmitting the SA message according to the configuration parameter.

In some examples of the method, apparatus, and non-transitory computer-readable medium described above, a SA message may be transmitted in any cluster within the selected cluster resources.

DETAILED DESCRIPTION

Figure 1:
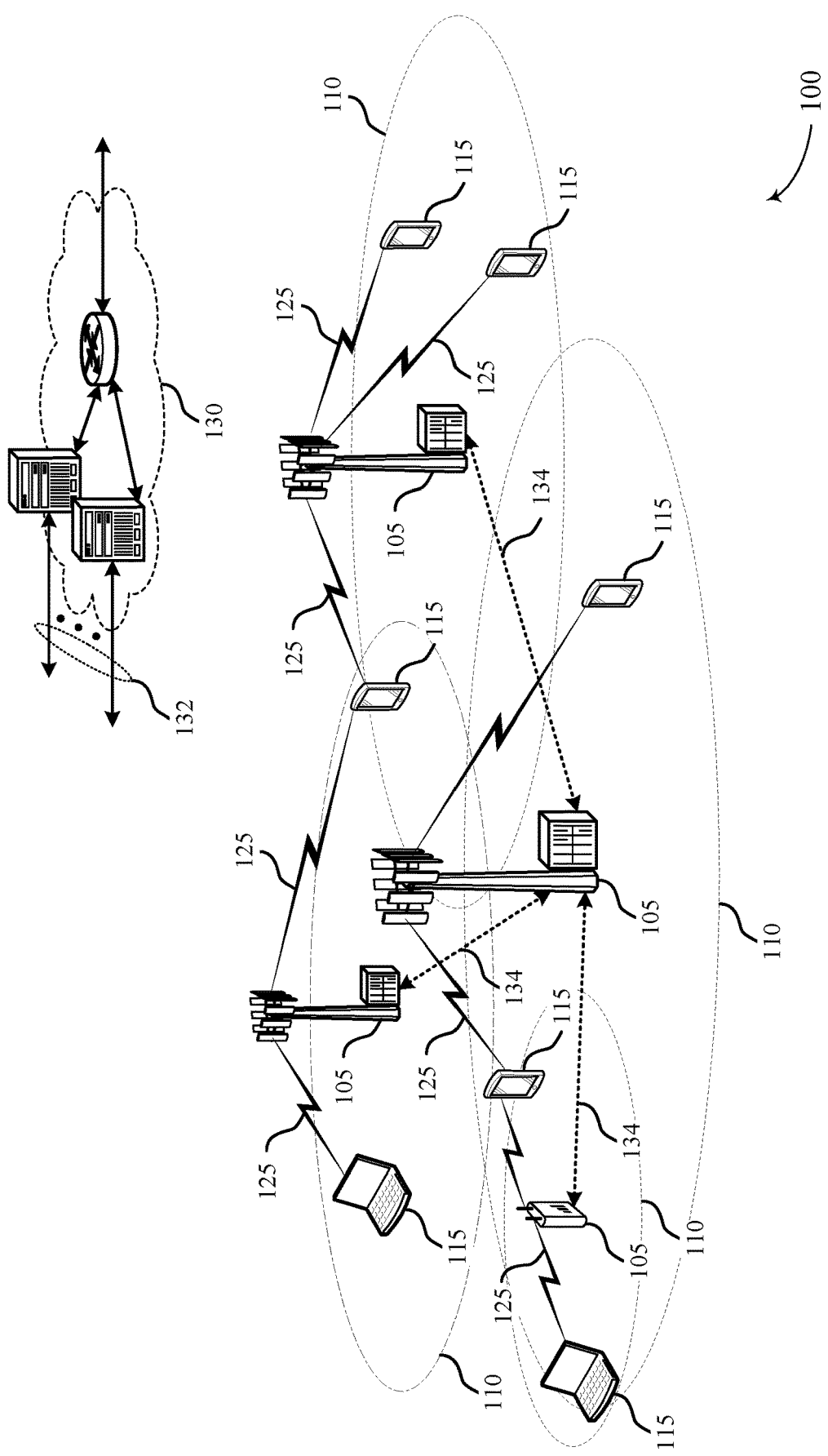
FIG. 1 illustrates an example of a wireless communications system that supports multi-cluster transmission in accordance with aspects of the present disclosure.

Vehicle based communication networks may provide significant improvements to driver assistance systems. Such vehicle based communication network may be referred to as vehicle-to-everything (V2X) networks, vehicle-to-vehicle (V2V) networks, cellular V2V (C-V2V) networks, etc. Vehicle based communication networks may include user equipments (UEs), also referred to as vehicle UEs (v-UEs), to communicate directly with infrastructure devices (vehicle-to-infrastructure (V2I)) to signal, for example, a traffic signal timing and priority, etc. The UEs may, for example, communicate directly with the network (e.g., a vehicle-to-network (V2N)) real-time traffic conditions and routing, cloud services, etc. The UEs may also communicate with pedestrian UEs (vehicle-to-pedestrian (V2P)) safety alerts to pedestrians, bicyclists, etc. The UEs may also communicate with other v-UEs for collision avoidance safety systems, etc.

In some examples, vehicle based communication networks may use cellular wireless communications systems, for example, long term evolution (LTE) and/or LTE-advanced (LTE-A) wireless communication systems. While this may provide numerous advantages, there may be some configurations of the cellular wireless communication network that otherwise limit or reduce some advantages of the vehicle based communication network. For example, a vehicle based communication network that use a cellular wireless communication system may be synchronous. This may support frequency division multiplexing (FDM) between transmissions by different UEs. This may provide an advantage of concentration of the transmission power on part of the bandwidth, and therefore increase link budget, or equivalently, extend communication range. This transmission may be contiguous in frequency (e.g., a single cluster) due to single carrier frequency division multiple access (SC-FDMA) configurations. Some cellular wireless communication systems, however, may be associated with predefined configurations that limit the power spectral density (PSD) for some transmissions.

Aspects of the disclosure are initially described in the context of a wireless communications system. For example, a UE of the vehicle based communication network may perform cellular communications using multi-cluster transmissions. The UE may determine to use multi-cluster communications and identify a configuration parameter for the multi-cluster communications. The configuration parameter may indicate that all or a portion of an available bandwidth for communications has been subdivided into equally sized clusters. Each available cluster may be associated with cluster resources. The UE may select a cluster resource from the available cluster resources (e.g., one or more clusters) and inform other nodes of the vehicle based communication network (e.g., other v-UEs, etc.) of the selection. The UE may transmit the multi-cluster transmission using the selected cluster resource.

Aspects of the disclosure are further illustrated by and described with reference to apparatus diagrams, system diagrams, and flowcharts that relate to multi-cluster SC-FDM transmission.

FIG. 1 illustrates an example of a wireless communications system 100 that supports multi-cluster transmission in accordance with aspects of the present disclosure. The wireless communications system 100 includes base stations 105, UEs 115, and a core network 130. In some examples, the wireless communications system 100 may be a LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, etc. A UE 115 may also be a v-UE and/or a wireless node, such as when participating in a vehicle based communication network.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications systems are widely deployed to provide various types of communication content such as voice, video, packet data, messaging, broadcast, and so on.

These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for one or more multiple communication devices, which may be otherwise known as a UE 115.

In some examples, wireless communications system 100 may include or support a vehicle based communication network. The vehicle based communication network may use all or a portion of wireless communications system 100 resources for wireless communications, including, for example, over-the-air resource assignment and control, data and control signaling, etc. A UE 115 may be connected to a base station 105 and participate in a vehicle based communication network. The UE 115 may determine to use multi-cluster communications in the vehicle based communication network based on, for example, signaling from the base station, a determination that the UE 115 is located in an area that supports multi-cluster communications, a determination that the vehicle based communication network includes a transmission power requirement, etc. The UE 115 may identify a configuration parameter for the multi-cluster communications. The configuration parameter may include or convey an indication of clusters that are being used for the multi-cluster communications. The clusters may include some or all of an available bandwidth that has been divided into the clusters. Each cluster may be the same size. That is, each cluster may have the same number of resource blocks (RBs), may occupy the same bandwidth, etc. Each cluster may be a resource for the purposes of the multi-cluster communications. The UE 115 may use the configuration parameter to select a cluster resource from the set of available cluster resources. The cluster resource may include one or more clusters that may be used for the multi-cluster communications. The UE 115 may transmit an indication of the selected cluster resource to other wireless nodes of the vehicle based communication network (i.e., other UEs). The UE 115 may transmit the multi-cluster transmission on the selected cluster resource.

Figure 2:
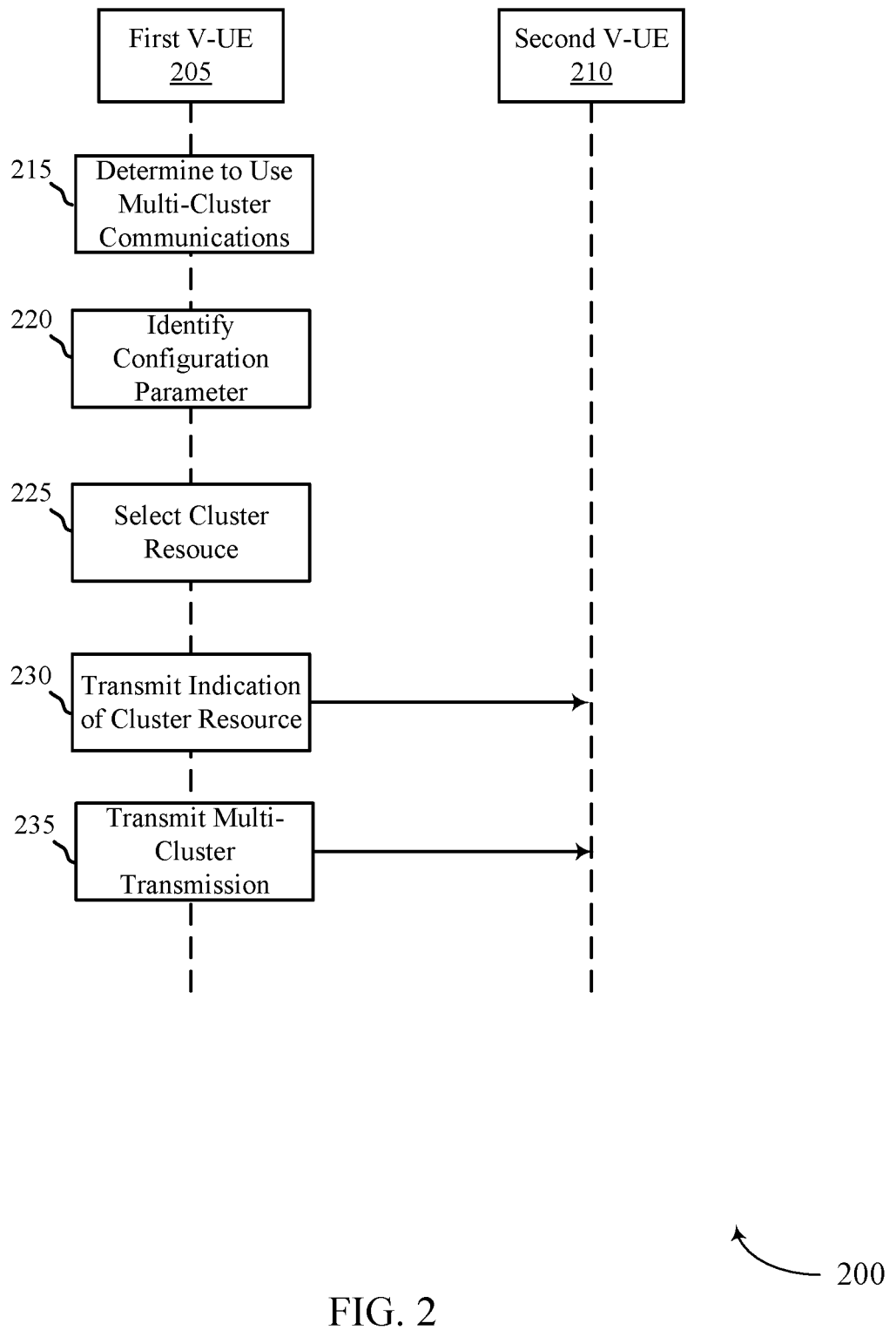
FIG. 2 illustrates an example of a process flow that supports multi-cluster transmission in accordance with aspects of the present disclosure.

FIG. 2 illustrates an example of a process flow 200 that supports multi-cluster transmission in accordance with aspects of the present disclosure. Process flow 200 may implement aspects of wireless communications system 100 as described with reference to FIG. 1. Process flow 200 may include first v-UE 205 and second v-UE 210, which may be examples of the corresponding devices as described with reference to FIG. 1. First v-UEs 205 and second v-UE 210 may communicate using a vehicle based communication network.

Some wireless communication systems, for example, cellular wireless communication systems, may include a transmission power requirement for a vehicle based communication network. In other examples, the vehicle based communication network may otherwise include or be associated with a transmission power requirement. One example of the transmission power requirement may include a predefined PSD limitation. As one non-limiting example, the PSD may be 23 dBm per MHz. This may provide for a wideband communication system to transmit 33 dBm over a 10 MHz bandwidth to comply with the PSD limitation. In some cases, a vehicle based communication network may transmit on 20 RBs, with 1 MHz being approximately 5.556 RBs. The vehicle based communication network may use single carrier FDMA (SC-FDMA) for the transmission on the 20 RBs. However, the PSD limitation may limit the maximum transmit power to approximately 27.7 dBm, which is lower than the 33 dBm transmission power otherwise permitted.

One way to address this issue is to allow for multi-cluster SC-FDMA transmissions. For example, one cluster may include 20 RBs. Since 1 MHz is approximately 5.556 RBs, the maximum power per RB may be 23 dBm−10*log$_{10}$ 5.556=15.55 dBm. In another example, a multi-cluster transmission scheme may include 10 clusters being used with 2 RBs in each cluster, and the spacing between adjacent clusters is 5 RBs. In this scheme, there may be 5.556−3=2.556 RBs in any 1 MHz bandwidth window; therefore the power per RB may be 23 dBm−10*log$_{10}$ 2.556=18.92 dBm, a 3.37 dBm gain compared to single-cluster transmission. Process flow 200 may provide a mechanism to enable multi-cluster communications in a vehicle based communication network.

At 215, first v-UE 205 may determine to use multi-cluster communications in a vehicle based communication network. For example, first v-UE 205 may identify a transmission power requirement associated with the vehicle based communication network. First v-UE 205 may identify the transmission power requirement based on communicating with a cellular communications network. For example, first v-UE 205 may identify the transmission power requirement based on an information element (IE) or other indicator received from a base station. In some examples, first v-UE 205 may identify the transmission power requirement when there is a failure to communication with a cellular communications network, for example, based on a location of first v-UE 205. For example, the first v-UE 205 may determine some locations, regions, networks operating within a particular area, etc., and identify the transmission power requirement based on the location. First v-UE 205 may determine to use multi-cluster communications based on the transmission power requirement. In some examples, first v-UE 205 may determine to use multi-cluster communications to minimize or avoid the impact of the transmission power requirement, for example, to overcome a PSD limitation.

Thus, in some aspects, first v-UE 205 may decide whether or not to use multi-cluster communications for multi-cluster transmissions. The determination of whether to use multi-cluster communications may be configured by the network, when there is network coverage, or preconfigured based on geographical area, when there is no cellular network coverage. The configuration or pre-configuration may also identify a number of clusters available for multi-cluster communications, for example, a maximum and minimum number of available clusters. The maximum and minimum number of available clusters may be specified for a different range of speeds of first v-UE 205. Furthermore, relative power distribution between clusters may be configured. For example, clusters available for SA messages (on, e.g., a control channel) may be associated with a higher PSD limitation than data message clusters. The configuration may be broadcast over the system information block (SIB), or may be transmitted using dedicated signaling.

At 220, first v-UE 205 may identify a configuration parameter. The configuration parameter may include or convey an indication of a cluster configuration that may be used for multi-cluster communications. The cluster configuration may include a plurality of clusters of the same size, for example, where each cluster has the same or a common bandwidth. In some cases, each cluster of the available clusters may include the same or a common number of RBs (e.g., 5 RBs). The cluster configuration may also include clusters located at different positions within the available bandwidth, for example, clusters that occupy the full available bandwidth, clusters that are evenly spaced across the available bandwidth, etc. In some examples, the configuration parameter may identify the number of clusters available for multi-cluster communications and the location of such available clusters. In some examples, the configuration parameter may identify which clusters are available for multi-cluster communications (e.g., the full cluster resource pool) and which clusters are available for first v-UE 205 to use for multi-cluster communications (e.g., a subset of cluster resources).

In some cases, first v-UE 205 may identify the configuration parameter based on preconfigured information. For example, first v-UE 205 may have the preconfigured information stored on first v-UE 205 and may access the preconfigured information based on a determination to use multi-cluster communications.

At 225, first v-UE 205 may select a cluster resource. The cluster resource may be selected from a set of available cluster resources and based on the configuration parameter. The cluster resource may identify or include one, or more than one, clusters used for multi-cluster communications in the vehicle based communication network. In some cases, first v-UE 205 may select a cluster resource that includes a sufficient number of clusters to transmit the information that first v-UE 205 has to communicate. The number of clusters associated with the cluster resource may also include resources used for scheduling assignment (SA) message transmission.

In some aspects, first v-UE 205 may select the cluster resource based on received power levels. For example, first v-UE 205 may receive and measure signals on a set of available cluster resources. Some clusters may have a high received energy level, and other clusters may have a low received energy level. Clusters having a low received energy level may indicate a low background noise, reduced traffic/interference, etc. Thus, a cluster having a low received energy level may, in some cases, be more suitable for multi-cast transmissions and therefore first v-UE 205 may select such a cluster.

In some cases, first v-UE 205 may rank each cluster from a set of available clusters based on a received energy level for each cluster. First v-UE 205 may select the cluster resource from a subset of available clusters based on a ranking of the clusters. In some cases, first v-UE 205 may rank the clusters during a subframe, for example, during a subframe in which first v-UE 205 may perform multi-cast communications. In some cases, first v-UE 205 may identify a subset count that identifies the number of clusters in the subset of available clusters. For example, first v-UE 205 may select two, three, or some other number of clusters from the available clusters to form the subset of clusters. First v-UE 205 may use an indication received from a base station and/or a preconfigured indication to select the cluster resource from the subset of clusters.

Thus, in some aspects different clusters may be indicated in the configuration parameter. By way of contrast, signaling required for arbitrary sized clusters may lead to prohibitively large overhead. The described techniques provide for a data resource pool to be divided into equal sized bandwidth parts (e.g., equally sized clusters). For example, a resource pool of 50 RBs may be divided into ten bandwidth parts of 5 RBs each. Such division may be a system level division, and may be known to all UEs using the resource pool. The division may be configured and/or preconfigured. If configured, the resource pool division may be indicated using broadcast or dedicated signaling. A cluster may be the same size as a bandwidth part and may be mapped to a bandwidth part. A UE, such as first v-UE 205, may, for example, indicate the selected bandwidth parts (e.g., a cluster resource) using a bitmap in the SA channel. The clusters (e.g., the available clusters and/or the selected clusters) may or may not be adjacent in frequency.

At 230, first v-UE 205 may transmit an indication to second v-UE 210 of the selected cluster resource. For example, first v-UE 205 may transmit a SA message to second v-UE 210. The SA message may include an indication of the selected cluster resource, for example, which clusters the first v-UE 205 has selected to use for multi-cluster communications. In some cases, the SA message may transmitted using any cluster within the selected cluster resource. In some cases, the cluster used for the SA message transmission may be based on the configuration parameter.

In some aspects, the indication may be transmitted in an SA message using a bitmap. The number of bits in the bitmap may be equal to a total number of clusters that are available for multi-cluster communications. For example, an $i^{th}$ bit set to 1 in the bitmap may indicate that an $i^{th}$ cluster is used for transmissions, and an $i^{th}$ bit set to 0 may indicate that an $i^{th}$ cluster is not used.

At 235, first v-UE 205 may transmit a multi-cluster transmission to second v-UE 210 using the selected cluster resource. The multi-cluster transmission may include transmission of a data message. First v-UE 205 may utilize one or more clusters, per the selected cluster resource, to transmit the multi-cluster transmission. The number of clusters forming the multi-cluster transmission may be based on the amount of information the first v-UE 205 has to communicate. In some cases, the SA message and the multi-cluster transmission may be transmitted in the same cluster. For example, the SA message may occupy the first two RBs of the cluster and the data may occupy the remaining RBs of the cluster.

In some cases, the SA message and the data message may transmitted at the same power level. In other cases, the SA message and the data message may be transmitted at different power levels. For example, first v-UE 205 may receive a parameter from a base station informing the first v-UE 205 to transmit the SA message and the data message at different power levels. The parameter may be received from the base station during a radio resource configuration (RRC) setup procedure.

In some aspects, resource selection in a vehicle based communication network may use sensing with semi-persistent transmissions. If multi-cluster transmission is allowed, a number of possible choices of available clusters may be large. As one non-limiting example, within a subframe that first v-UE 205 has information to transmit on 3 clusters, and if 10 clusters are available, there would be 120 possible combinations to choose from. This may lead to large complexity. Instead, the described techniques provide that, in some cases, for each subframe, clusters may be ranked according to received energy levels. Then, first v-UE 205 may consider k clusters with a lowest received energy. The value of k may be configured (e.g., using broadcast or dedicated signaling), preconfigured, and/or may be a function of a number of clusters that first v-UE 205 is planning to select. For example, k may be twice the number of clusters that first v-UE 205 is planning to select.

Moreover, if the resource pool is configured to transmit a SA message and the corresponding data message in the same subframe, then the transmissions on one cluster may include the SA message and the data message transmitted together, e.g., transmitted in the same cluster. In other words, one cluster may include SA message of fixed size (e.g., 2 RBs for vehicle based communication network) and the remaining part of the cluster may be occupied by one or two clusters containing data. The position of the SA transmission may be defined by SA resource pool configuration. First v-UE 205 may select the cluster containing the SA message randomly among the selected clusters and/or as a function of the received energy of the currently selected clusters.

Additionally, the control channel may be protected according to the described techniques. If the SA message is lost, the receiver (e.g., second v-UE 210) cannot decode the corresponding data message even if the channel condition in data channel is good. In some cases, the number of choices for SA resource locations may be limited to reduce the number of blind SA decoding attempts, so there may be more chances for SA-SA collision (e.g., the SA message of one UE may be sent in the same resource as the SA message of another UE). As the SA messages from all UEs may use a same reference signal (RS) sequence, this kind of collision may cause the UEs to estimate the channel incorrectly and accordingly reduce control channel performance. By allowing the SA message to be included in any cluster of the available clusters, the issue is mitigated.

In some aspects, there may be collisions between the SA message transmitted from one UE and the data message transmitted from another UE. This collision may be more acceptable than SA message-to-SA message collisions, as the SA RS is different from a data message RS and the UE may perform channel estimation properly.

Figure 3:
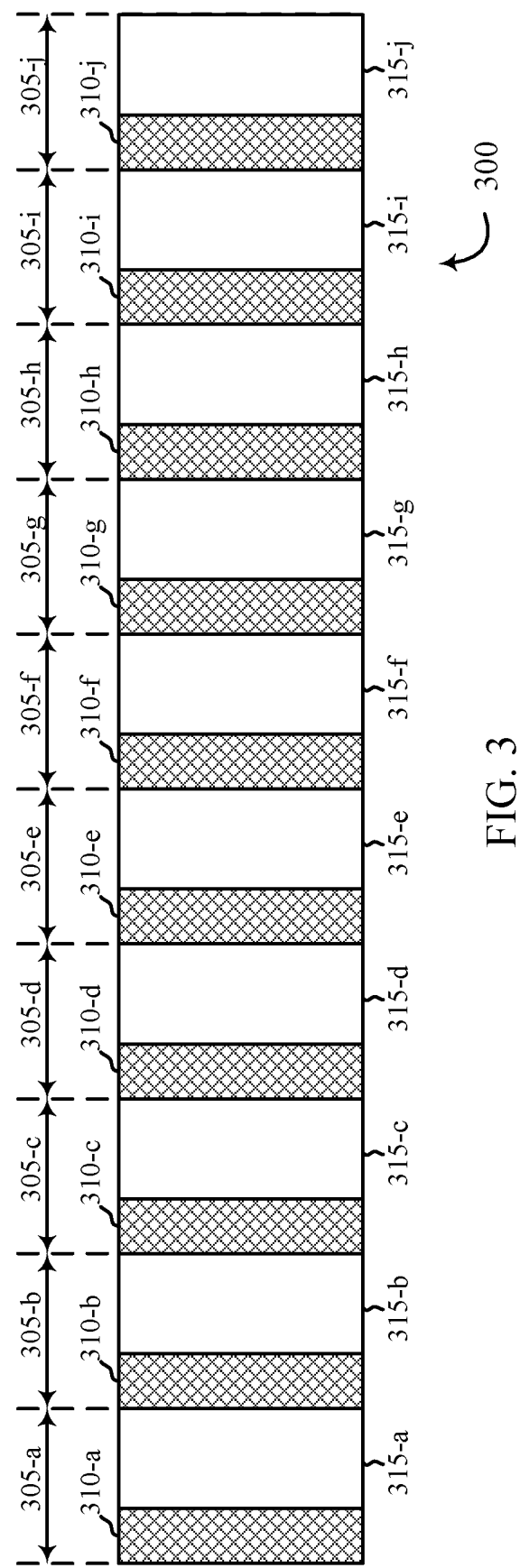
FIG. 3 illustrates an example of a cluster configuration that supports multi-cluster transmission in accordance with aspects of the present disclosure.

FIG. 3 illustrates an example of a cluster configuration 300 that supports multi-cluster transmission in accordance with aspects of the present disclosure. Cluster configuration 300 may be implemented by aspects of wireless communications system 100 as described with reference to FIG. 1. For example, a UE 115 may support wireless communications using cluster configuration 300.

Cluster configuration 300 may include an available bandwidth that has been divided into a plurality of equally sized clusters 305. Some or all of the clusters 305 may include an SA portion 310 and a data portion 315 where the SA portion 310 may be used for SA message transmissions. In some examples, each cluster 305 may include 5 RBs where the SA portion 310 may include two RBs and the data portion 315 may include the remaining three RBs. In some cases, the configuration parameter may include an indication of the cluster configuration that may be used for multi-cluster communications in a vehicle based communication network. For example, the configuration parameter may identify the number of clusters 305 that are available for multi-cluster transmissions, which clusters include SA portions 310 and/or may be used for SA message transmission, etc.

In some examples, a data messages may be transmitted on one, or more than one, of clusters 305. In some examples, the data message may be transmitted on the remaining portion of a cluster 305 (e.g., following the SA message transmission using the SA portion 310) and occupy one or more additional clusters for the remaining portion of the data message.

Cluster configuration 300 may include the available spectrum being divided into clusters 305 having the same size, for example, occupying the same bandwidth and/or having the same number of RBs. The size of clusters 305 may, in some cases, be fixed for the vehicle based communication network and may be configured by the network. Thus, cluster configuration 300 may include 50 RBs that are divided into clusters 305-*a*, 305-*b*, 305-*c*, 305-*d*, 305-*e*, 305-*f*, 305-*h*, 305-*i*, and 305-*j*. Each of the clusters 305 forming the cluster configuration 300 may include a corresponding SA portion 310 and data portion 315. A UE, such as first v-UE 205 as described with reference to FIG. 2, may use a configuration parameter to identify the clusters 305 of cluster configuration 300 that form the set of available clusters.

Cluster configuration 300 accordingly illustrates an example where a spectrum spanning 50 RBs are divided into ten equally sized clusters 305. Each cluster 305 may include five RBs, with SA portion 310 occupying 2 RBs and the remaining 3 RBs being occupied by data portion 315. In cluster configuration 300, a v-UE may select any of the SA portions 310 to transmit the SA message.

Figure 4A:
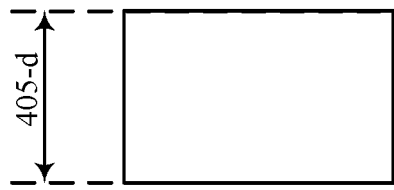
FIGS. 4A and 4B illustrate examples of multi-cluster transmissions in accordance with aspects of the present disclosure.
Figure 4A:
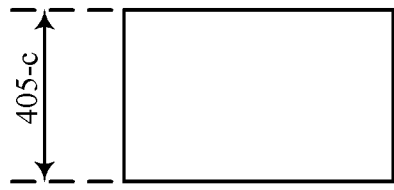
Figure 4A:
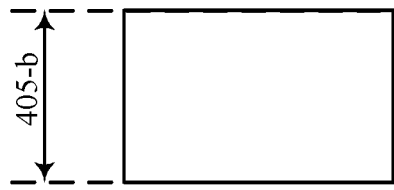
Figure 4A:
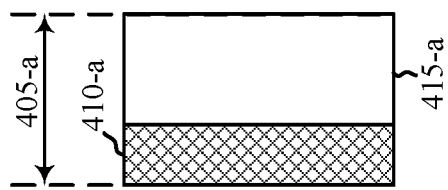
Figure 4B:
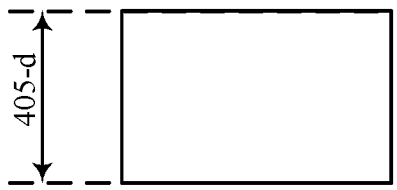
Figure 4B:
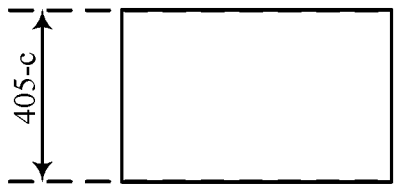
Figure 4B:
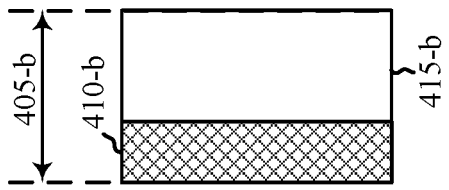

FIGS. 4A and 4B illustrate examples of multi-cluster transmissions 400 in accordance with aspects of the present disclosure. Multi-cluster transmissions 400 may be implemented by aspects of wireless communications system 100 as described with reference to FIG. 1. For example, a UE 115 may support wireless communications using multi-cluster transmissions 400. In some cases, a v-UE may select multi-cluster transmissions 400 from a set of available clusters, for example, from cluster configuration 300 as described with reference to FIG. 3.

With reference to FIG. 4A, multi-cluster transmission 400-*a* may be selected by a v-UE from cluster configuration 300 as described with reference to FIG. 3, and may include clusters 405-*a*, 405-*b*, 405-*c*, and 405-*d*, which may or may not be adjacent in frequency. From the selected clusters 405, the UE may select (e.g., randomly) SA portion 410-*a* of cluster 405-*a* for the SA message transmission. Accordingly, the data message associated with the SA message may include data portion 415-*a* of cluster 405-*a* as well as the entirety of clusters 405-*b*, 405-*c*, and 405-*d*.

With reference to FIG. 4B, multi-cluster transmission 400-*b* may be selected by a v-UE from cluster configuration 300 as described with reference to FIG. 3 and may include clusters 405-*a*, 405-*b*, 405-*c*, and 405-*d*, which may or may not be adjacent in frequency. From the selected clusters 405, the UE may select (e.g., randomly) SA portion 410-*b* of cluster 405-*b* for the SA message transmission. Accordingly, the data message associated with the SA message may include data portion 415-*b* of cluster 405-*b* as well as the entirety of clusters 405-*a*, 405-*c*, and 405-*d*.

Figure 5:
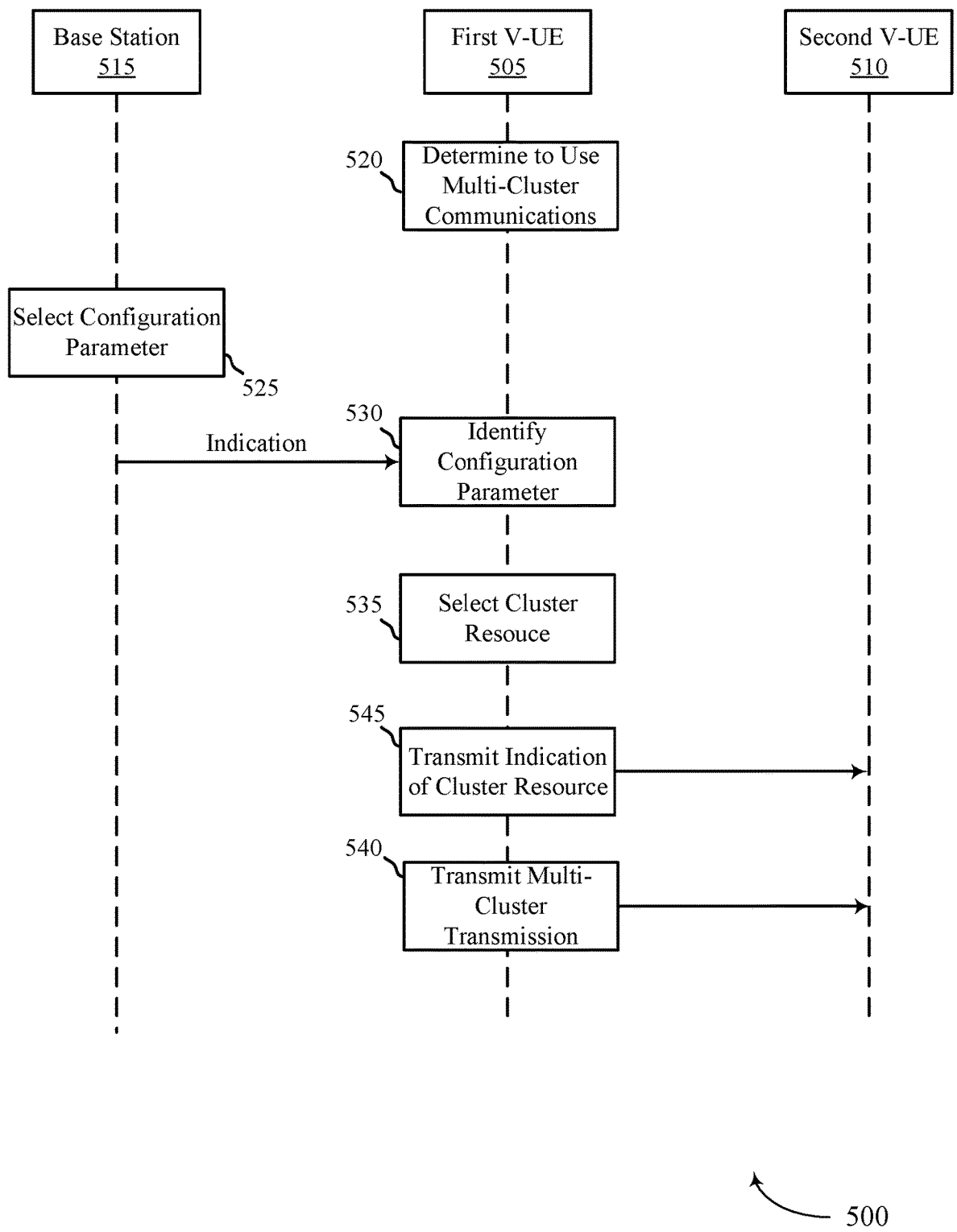
FIG. 5 illustrates an example of a process flow that supports multi-cluster transmission in accordance with aspects of the present disclosure.

FIG. 5 illustrates an example of a process flow 500 that supports multi-cluster transmission in accordance with aspects of the present disclosure. Process flow 500 may implement aspects of wireless communications system 100 as described with reference to FIG. 1. Process flow 500 may include first v-UE 505, second v-UE 510, and base station 515, which may be examples of the corresponding devices as described with reference to FIG. 1. First v-UE 505, second v-UE 510, and base station 515 may communicate using a vehicle based communication network.

At 520, first v-UE 505 may determine to use multi-cluster communications in a vehicle based communication network. For example, first v-UE 505 may identify a transmission power requirement associated with the vehicle based communication network. First v-UE 505 may identify the transmission power requirement based on communicating with a cellular communications network. For example, first v-UE 505 may identify the transmission power requirement based on an information element (IE) or other indicator received from base station 515. In some examples, first v-UE 505 may identify the transmission power requirement when there is a failure to communication with a cellular communications network, for example, based on the location of first v-UE 505.

At 525, base station 515 may select a configuration parameter for the vehicle based communication network. The configuration parameter may include or convey an indication of a cluster configuration that may be used for multi-cluster communications. The cluster configuration may include a plurality of clusters of the same size, e.g., each cluster has the same or a common bandwidth. In some cases, each cluster of the available clusters may include the same or a common number of RBs (e.g., 5 RBs). The cluster configuration may also include clusters located at different positions within the available bandwidth, for example, clusters that occupy the full available bandwidth, clusters that are evenly spaced across the available bandwidth, etc. In some examples, the configuration parameter may identify the number of clusters available for multi-cluster communications and/or the location of such available clusters. In some examples, the configuration parameter may identify which clusters are available for multi-cluster communications (e.g., the full cluster resource pool) and/or which clusters are available for first v-UE 505 to use for multi-cluster communications (e.g., a subset of cluster resources).

At 530, base station 515 may transmit, and first v-UE 505 may receive and identify, an indication of the selected configuration parameter. For example, first v-UE 505 may receive a message from base station 515 that conveys an indication of the configuration parameter. In some cases, the message may be received in a RRC setup message. The indication may identify the set of available cluster resources for multi-cluster communications in a vehicle based communication network. In some examples, the message may be broadcast from base station 515.

At 535, first v-UE 505 may select a cluster resource. The cluster resource may be selected from a set of available cluster resources and based on the configuration parameter. The cluster resource may identify or include one, or more than one, clusters used for multi-cluster communications in the vehicle based communication network.

At 540, first v-UE 505 may transmit an indication to second v-UE 510 of the selected cluster resource. For example, first v-UE 505 may transmit a SA message to second v-UE 510. The SA message may include an indication of the selected cluster resource, e.g., which clusters first v-UE 505 has selected to use for multi-cluster communications. In some cases, the SA message may transmitted using any cluster within the selected cluster resource. In some cases, the cluster used for the SA message transmission may be based on the configuration parameter.

At 545, first v-UE 505 may transmit a multi-cluster transmission to second v-UE 510 using the selected cluster resource. The multi-cluster transmission may include transmission of a data message. First v-UE 505 may utilize one or more than one clusters, per the selected cluster resource, to transmit the multi-cluster transmission. The number of clusters forming the multi-cluster transmission may be based on the amount of information first v-UE 505 has to communicate.

Figure 6:
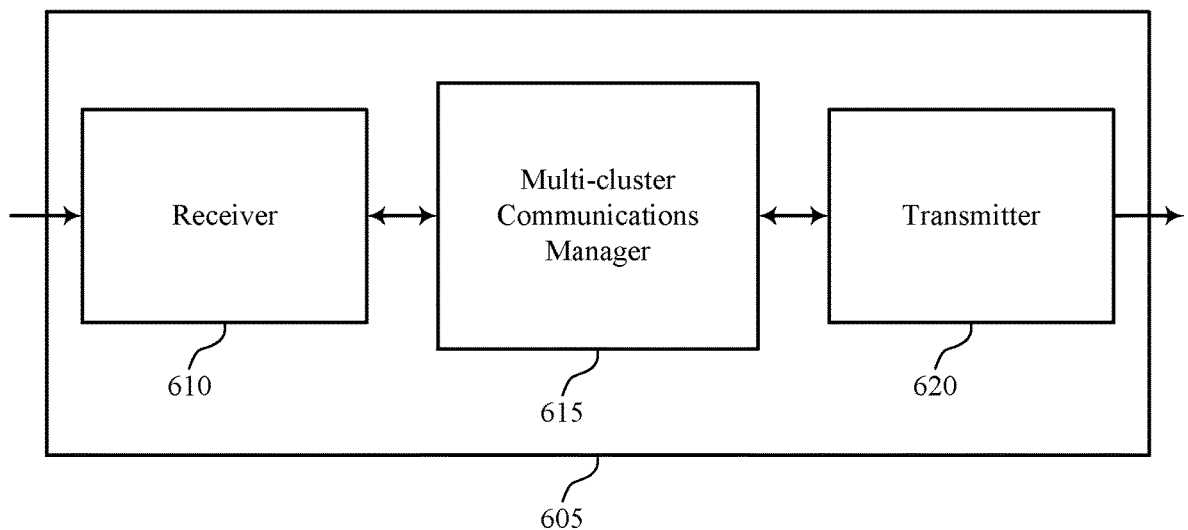
FIGS. 6 through 7 show block diagrams of a wireless device that support multi-cluster transmission in accordance with aspects of the present disclosure.

FIG. 6 shows a block diagram 600 of a wireless device 605 that supports multi-cluster transmission in accordance with various aspects of the present disclosure. Wireless device 605 may be an example of aspects of a UE 115 as described with reference to FIG. 1. Wireless device 605 may be an example of aspects of a v-UE 205 or v-UE 505, as described with reference to FIGS. 2 and 5. Wireless device 605 may include receiver 610, a multi-cluster communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to multi-cluster transmission, etc.). Information may be passed on to other components of the device. The receiver 610 may be an example of aspects of the transceiver 935 as described with reference to FIG. 9.

Multi-cluster communications manager 615 may be an example of aspects of the multi-cluster communications manager 915 as described with reference to FIG. 9.

Multi-cluster communications manager 615 may determine to use multi-cluster communications in a vehicle based communication network, identify a configuration parameter associated with the multi-cluster communications, and select, based on the configuration parameter, a cluster resource from a set of available cluster resources, the cluster resource including one or more clusters used for a multi-cluster transmission in the vehicle based communication network.

Transmitter 620 may transmit signals generated by other components of the device. In some examples, the transmitter 620 may be collocated with a receiver 610 in a transceiver module. For example, the transmitter 620 may be an example of aspects of the transceiver 935 as described with reference to FIG. 9. The transmitter 620 may include a single antenna, or it may include a set of antennas.

Transmitter 620 may transmit an indication of the selected cluster resource to at least one wireless node of the vehicle based communication network, transmit the multi-cluster transmission on the selected cluster resource, and transmit a data message as the multi-cluster transmission.

Figure 7:
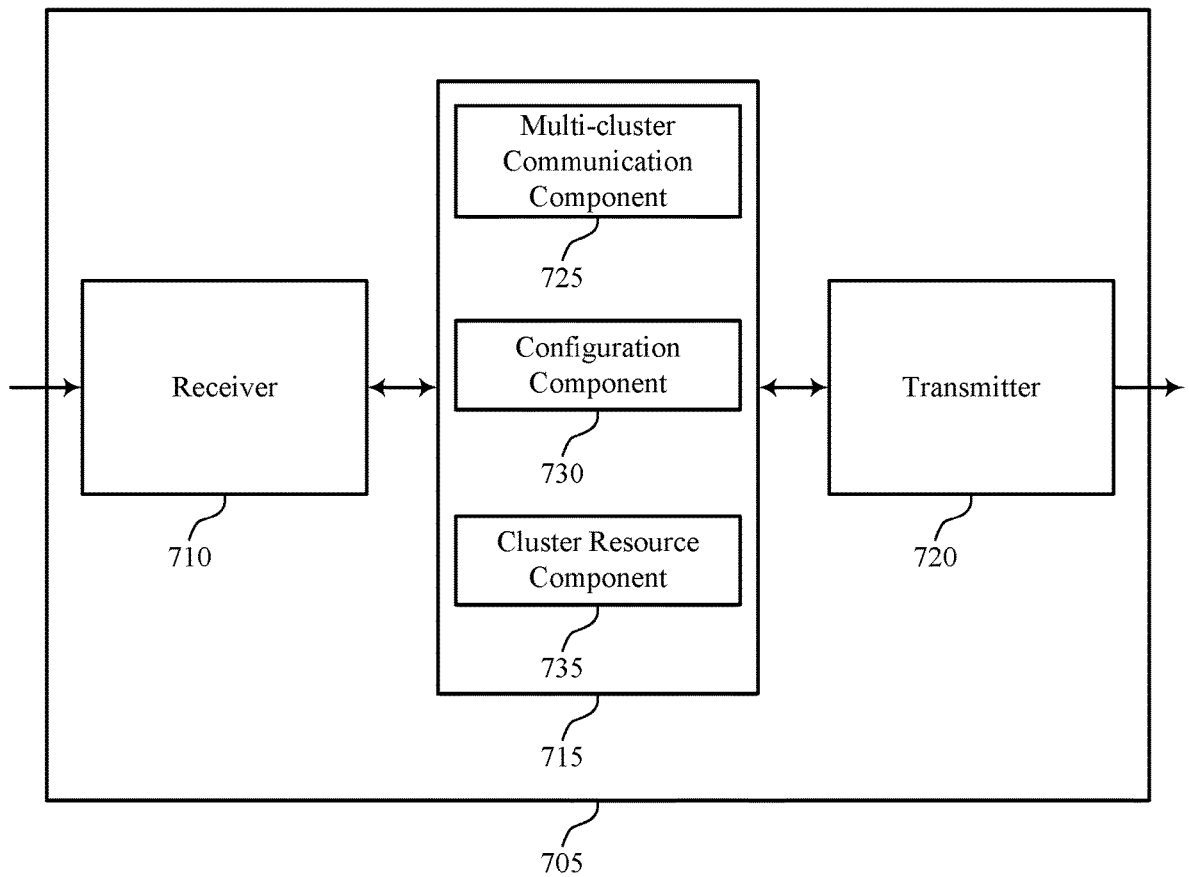

FIG. 7 shows a block diagram 700 of a wireless device 705 that supports multi-cluster transmission in accordance with various aspects of the present disclosure. Wireless device 705 may be an example of aspects of a wireless device 605, a v-UE 205/405, and/or a UE 115 as described with reference to FIGS. 1 through 6. Wireless device 705 may include receiver 710, multi-cluster communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multi-cluster transmission, etc.). Information may be passed on to other components of the device. The receiver 710 may be an example of aspects of the transceiver 935 as described with reference to FIG. 9.

Multi-cluster communications manager 715 may be an example of aspects of the multi-cluster communications manager 915 as described with reference to FIG. 9.

Multi-cluster communications manager 715 may also include multi-cluster communication component 725, configuration component 730, and cluster resource component 735.

Multi-cluster communication component 725 may determine to use multi-cluster communications in a vehicle based communication network.

Configuration component 730 may receive a message from a base station that conveys an indication of the configuration parameter and identify a configuration parameter associated with the multi-cluster communications. In some cases, the message is received during a RRC setup exchange. In some cases, the indication of the configuration parameter identifies the set of available cluster resources. In some cases, the indication of the configuration parameter is received via a broadcast transmission from the base station.

Cluster resource component 735 may select, based on the configuration parameter, a cluster resource from a set of available cluster resources, the cluster resource including one or more clusters used for a multi-cluster transmission in the vehicle based communication network. In some cases, the set of available cluster resources includes a set of clusters, where each cluster of the set of clusters include a common bandwidth parameter. In some cases, each cluster of the set of clusters include a common resource block parameter.

Transmitter 720 may transmit signals generated by other components of the device. In some examples, the transmitter 720 may be collocated with a receiver 710 in a transceiver module. For example, the transmitter 720 may be an example of aspects of the transceiver 935 as described with reference to FIG. 9. The transmitter 720 may include a single antenna, or it may include a set of antennas.

Figure 8:
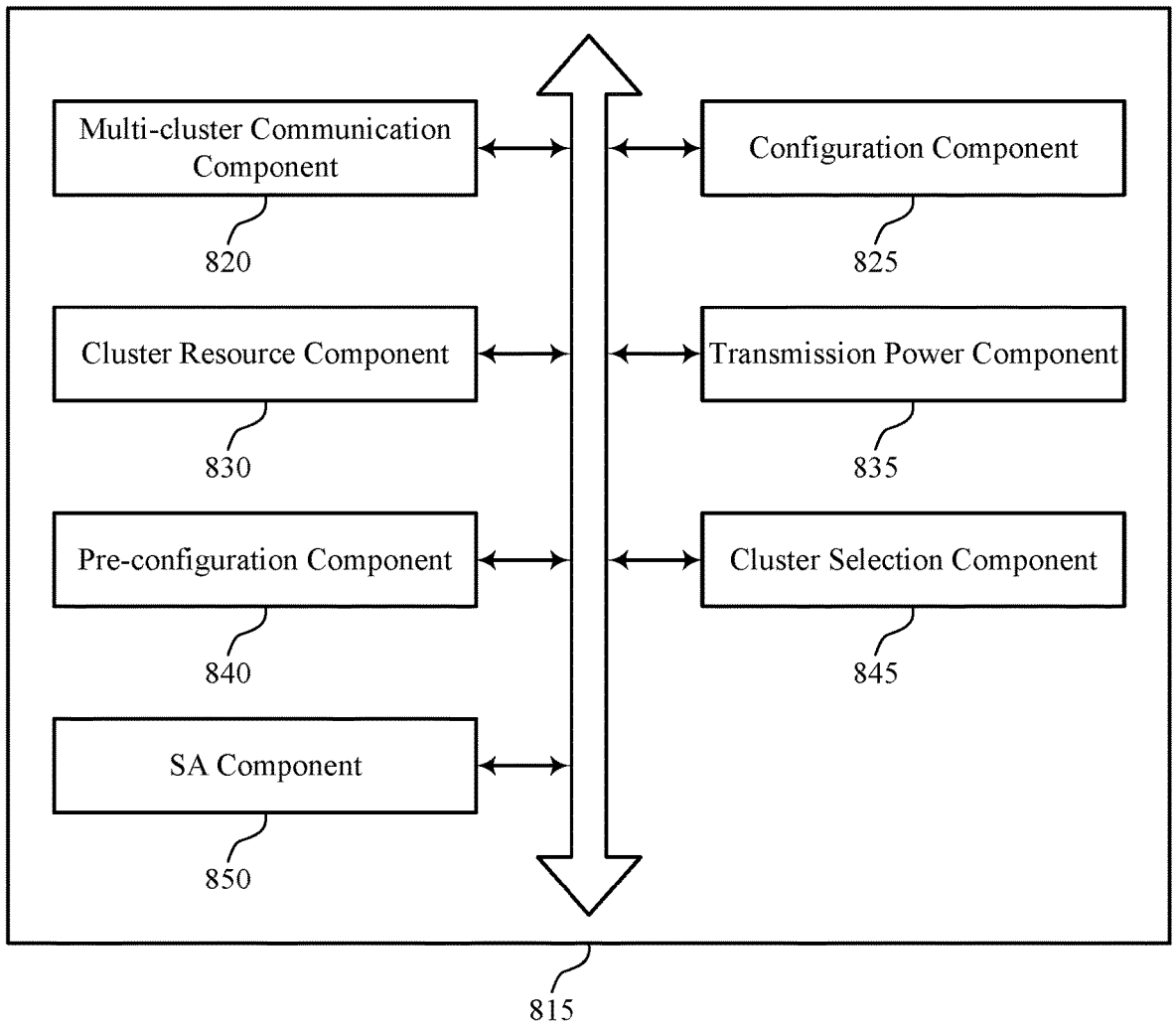
FIG. 8 shows a block diagram of a multi-cluster communications manager that supports multi-cluster transmission in accordance with various aspects of the present disclosure.

FIG. 8 shows a block diagram 800 of a multi-cluster communications manager 815 that supports multi-cluster transmission in accordance with various aspects of the present disclosure. The multi-cluster communications manager 815 may be an example of aspects of a multi-cluster communications manager 615, a multi-cluster communications manager 715, or a multi-cluster communications manager 915 as described with reference to FIGS. 6, 7, and 9. The multi-cluster communications manager 815 may include multi-cluster communication component 820, configuration component 825, cluster resource component 830, transmission power component 835, pre-configuration component 840, cluster selection component 845, and SA component 850. Each of these modules may communicate, directly or indirectly, with one another (e.g., via one or more buses).

Multi-cluster communication component 820 may determine to use multi-cluster communications in a vehicle based communication network.

Configuration component 825 may receive a message from a base station that conveys an indication of the configuration parameter and identify a configuration parameter associated with the multi-cluster communications. In some cases, the message is received during a RRC setup exchange. In some cases, the indication of the configuration parameter identifies the set of available cluster resources. In some cases, the indication of the configuration parameter is received via a broadcast transmission from the base station.

Cluster resource component 830 may select, based on the configuration parameter, a cluster resource from a set of available cluster resources, the cluster resource including one or more clusters used for a multi-cluster transmission in the vehicle based communication network. In some cases, the set of available cluster resources includes a set of clusters, where each cluster of the set of clusters include a common bandwidth parameter. In some cases, each cluster of the set of clusters include a common resource block parameter.

Transmission power component 835 may identify a transmission power requirement associated with the vehicle based communication network when there is communications with a cellular communications network, where the determining to use the multi-cluster communications is based on the identified transmission power requirement and identify a transmission power requirement associated with the vehicle based communication network based on a location parameter of the UE when there is a failure to communicate with a cellular communications network, where the determining to use the multi-cluster communications is based on the transmission power requirement. In some cases, the transmission power requirement is based on a parameter obtained from a base station.

Pre-configuration component 840 may identify the configuration parameter based on preconfigured information and access the preconfigured information based on the determining to use multi-cluster communications.

Cluster selection component 845 may rank each cluster associated with the set of available cluster resources according to a received energy level associated with each cluster, select the cluster resource from a subset of available clusters based on the ranking for each cluster, identify a subset count identifying the number of clusters in the subset of available clusters being used for the multi-cluster transmission, and us at least one of an indication received from a base station or a preconfigured indication to select the cluster resource. In some cases, the ranking of each cluster is performed for a subframe.

SA component 850 may transmit a SA message as the indication of the selected cluster resource, transmit the SA message and the data message at different transmit power levels based on a parameter received from a base station during a RRC setup procedure, transmit the SA message and at least a portion of the data message in the same cluster, and select the cluster resource for transmitting the SA message according to the configuration parameter. In some cases, the SA message and the data message are transmitted at different transmit power levels. In some cases, the SA message and the data message are transmitted at the same transmit power levels. In some cases, a SA message may be transmitted in any cluster within the selected cluster resource.

Figure 9:
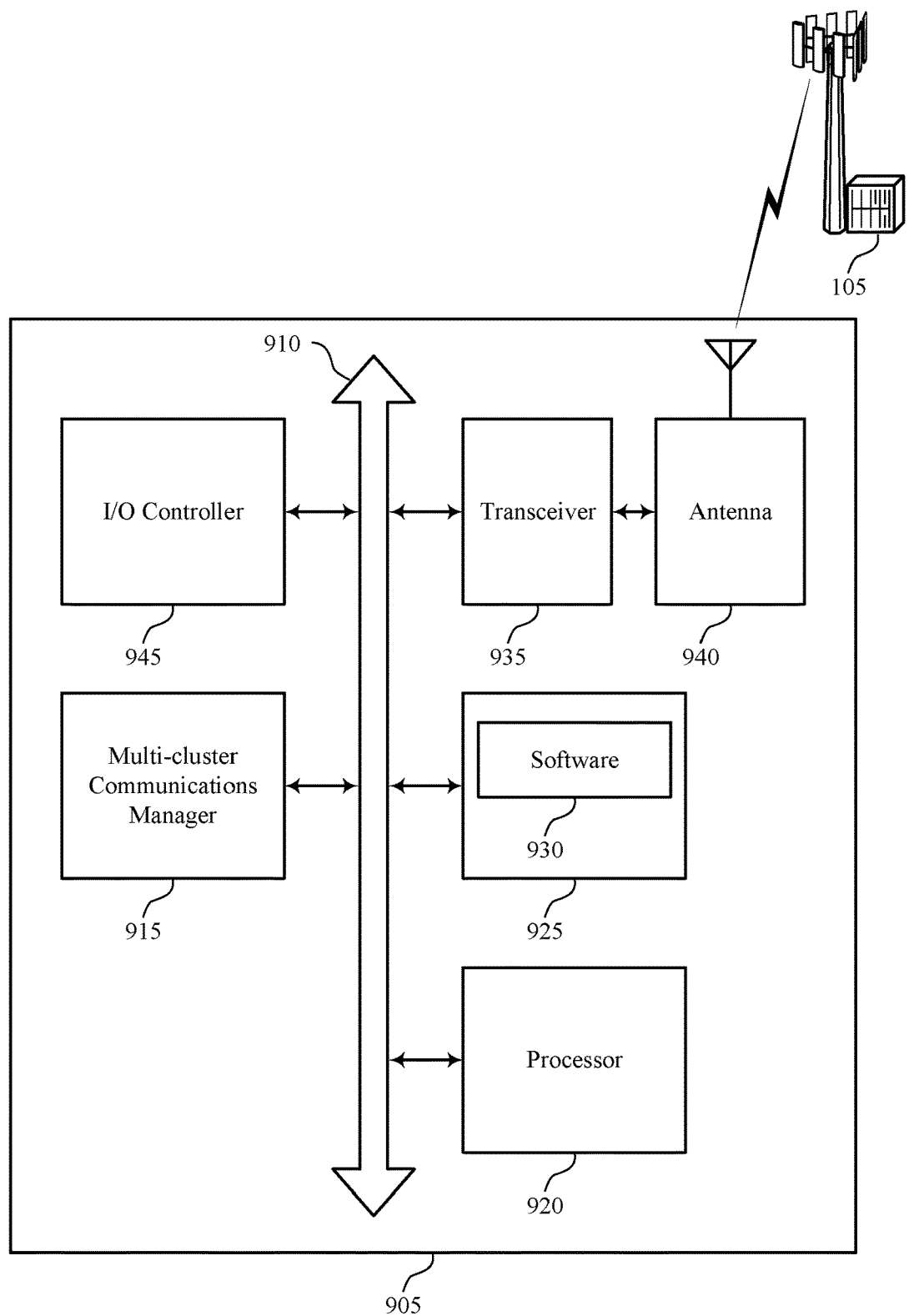
FIG. 9 shows a block diagram of a system including a device that supports multi-cluster transmission in accordance with aspects of the present disclosure.

FIG. 9 shows a block diagram of a system including a device 905 that supports multi-cluster transmission in accordance with various aspects of the present disclosure. Device 905 may be an example of or include the components of wireless device 605, wireless device 705, a v-UE 205/405, and/or a UE 115 as described above, e.g., with reference to FIGS. 1 through 7. Device 905 may include components for bi-directional voice and data communications including components for transmitting and receiving communications, including multi-cluster communications manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting multi-cluster transmission).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support multi-cluster SC-FDM transmission. Software 930 may be stored in a non-transitory computer-readable medium such as system memory or other memory. In some cases, the software 930 may not be directly executable by the processor but may cause a computer (e.g., when compiled and executed) to perform functions described herein).

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
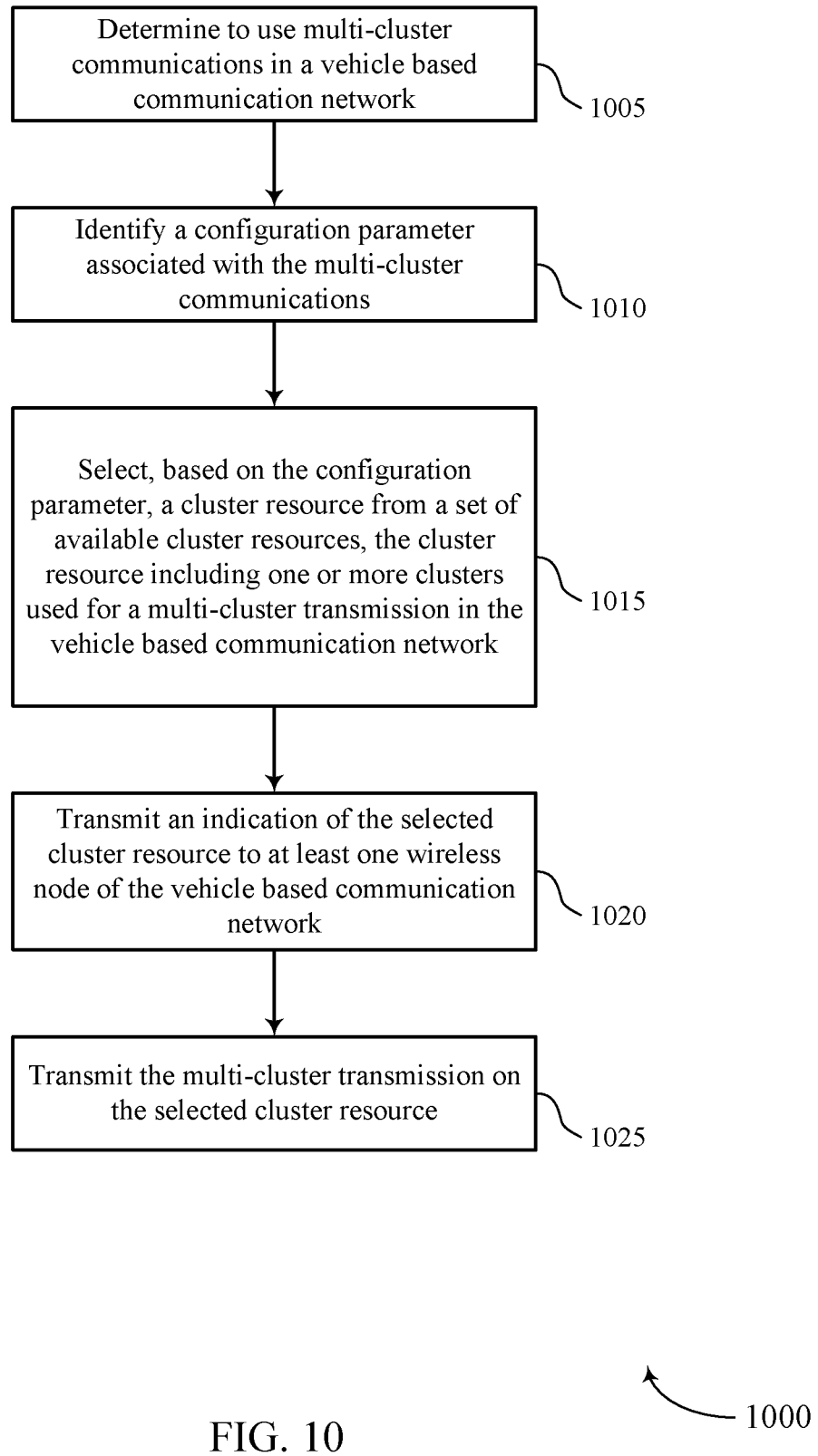
FIGS. 10 through 12 show flowcharts illustrating methods for multi-cluster transmission in accordance with aspects of the present disclosure.

FIG. 10 shows a flowchart illustrating a method 1000 for multi-cluster transmission in accordance with various aspects of the present disclosure. The operations of method 1000 may be implemented by a UE 115 or its components as described herein. For example, the operations of method 1000 may be performed by a multi-cluster communications manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1005 the UE 115 may determine to use multi-cluster communications in a vehicle based communication network. The operations of block 1005 may be performed according to the methods as described with reference to FIGS. 1 through 5. In certain examples, aspects of the operations of block 1005 may be performed by a multi-cluster communication component as described with reference to FIGS. 6 through 9.

At block 1010 the UE 115 may identify a configuration parameter associated with the multi-cluster communications. The operations of block 1010 may be performed according to the methods as described with reference to FIGS. 1 through 5. In certain examples, aspects of the operations of block 1010 may be performed by a configuration component as described with reference to FIGS. 6 through 9.

At block 1015 the UE 115 may select, based at least in part on the configuration parameter, a cluster resource from a set of available cluster resources, the cluster resource comprising one or more clusters used for a multi-cluster transmission in the vehicle based communication network. The operations of block 1015 may be performed according to the methods as described with reference to FIGS. 1 through 5. In certain examples, aspects of the operations of block 1015 may be performed by a cluster resource component as described with reference to FIGS. 6 through 9.

At block 1020 the UE 115 may transmit an indication of the selected cluster resource to at least one wireless node of the vehicle based communication network. The operations of block 1020 may be performed according to the methods as described with reference to FIGS. 1 through 5. In certain examples, aspects of the operations of block 1020 may be performed by a transmitter as described with reference to FIGS. 6 through 9.

At block 1025 the UE 115 may transmit the multi-cluster transmission on the selected cluster resource. The operations of block 1025 may be performed according to the methods as described with reference to FIGS. 1 through 5. In certain examples, aspects of the operations of block 1025 may be performed by a transmitter as described with reference to FIGS. 6 through 9.

Figure 11:
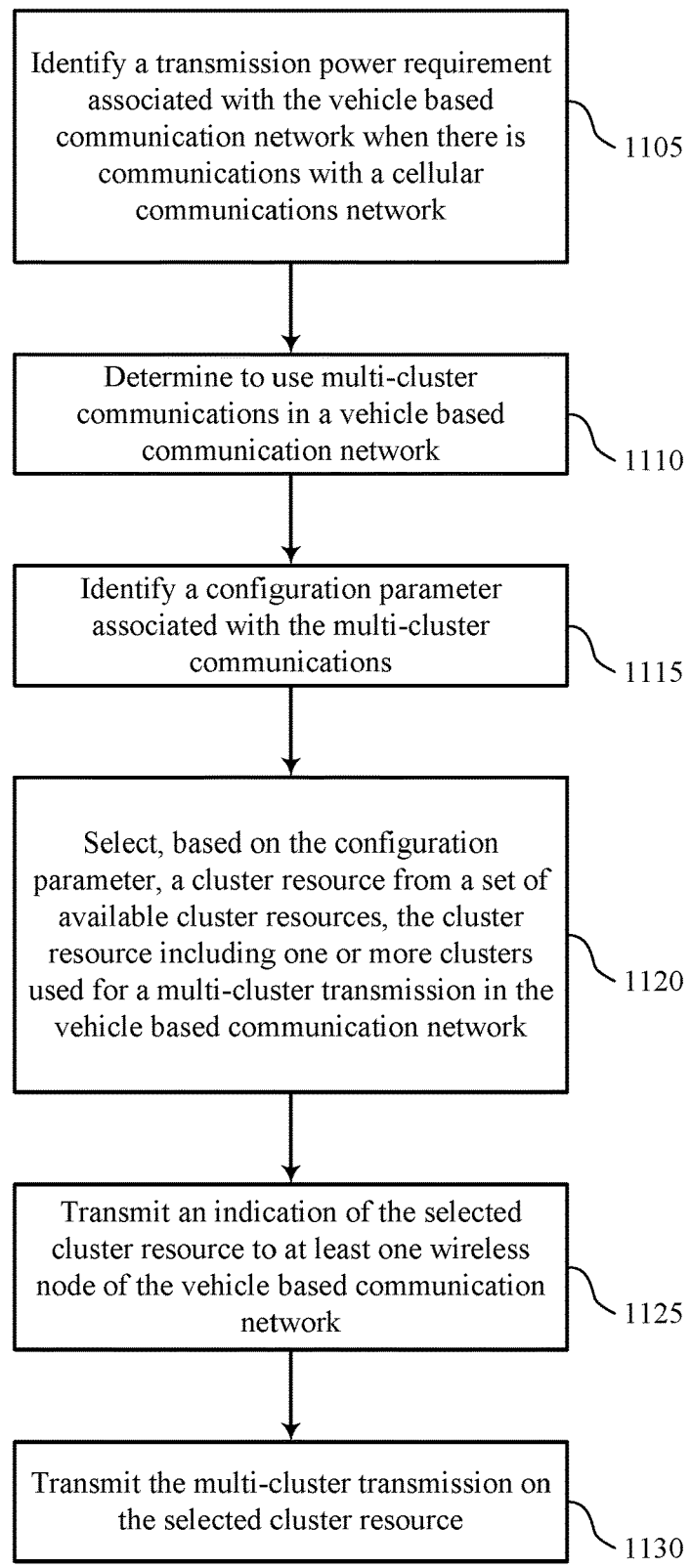

FIG. 11 shows a flowchart illustrating a method 1100 for multi-cluster transmission in accordance with various aspects of the present disclosure. The operations of method 1100 may be implemented by a UE 115 or its components as described herein. For example, the operations of method 1100 may be performed by a multi-cluster communications manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1105 the UE 115 may identify a transmission power requirement associated with the vehicle based communication network when there is communications with a cellular communications network, wherein the determining to use the multi-cluster communications is based at least in part on the identified transmission power requirement. The operations of block 1105 may be performed according to the methods as described with reference to FIGS. 1 through 5. In certain examples, aspects of the operations of block 1105 may be performed by a transmission power component as described with reference to FIGS. 6 through 9.

At block 1110 the UE 115 may determine to use multi-cluster communications in a vehicle based communication network. The operations of block 1110 may be performed according to the methods as described with reference to FIGS. 1 through 5. In certain examples, aspects of the operations of block 1110 may be performed by a multi-cluster communication component as described with reference to FIGS. 6 through 9.

At block 1115 the UE 115 may identify a configuration parameter associated with the multi-cluster communications. The operations of block 1115 may be performed according to the methods as described with reference to FIGS. 1 through 5. In certain examples, aspects of the operations of block 1115 may be performed by a configuration component as described with reference to FIGS. 6 through 9.

At block 1120 the UE 115 may select, based at least in part on the configuration parameter, a cluster resource from a set of available cluster resources, the cluster resource comprising one or more clusters used for a multi-cluster transmission in the vehicle based communication network. The operations of block 1120 may be performed according to the methods as described with reference to FIGS. 1 through 5. In certain examples, aspects of the operations of block 1120 may be performed by a cluster resource component as described with reference to FIGS. 6 through 9.

At block 1125 the UE 115 may transmit an indication of the selected cluster resource to at least one wireless node of the vehicle based communication network. The operations of block 1125 may be performed according to the methods as described with reference to FIGS. 1 through 5. In certain examples, aspects of the operations of block 1125 may be performed by a transmitter as described with reference to FIGS. 6 through 9.

At block 1130 the UE 115 may transmit the multi-cluster transmission on the selected cluster resource. The operations of block 1130 may be performed according to the methods as described with reference to FIGS. 1 through 5. In certain examples, aspects of the operations of block 1130 may be performed by a transmitter as described with reference to FIGS. 6 through 9.

Figure 12:
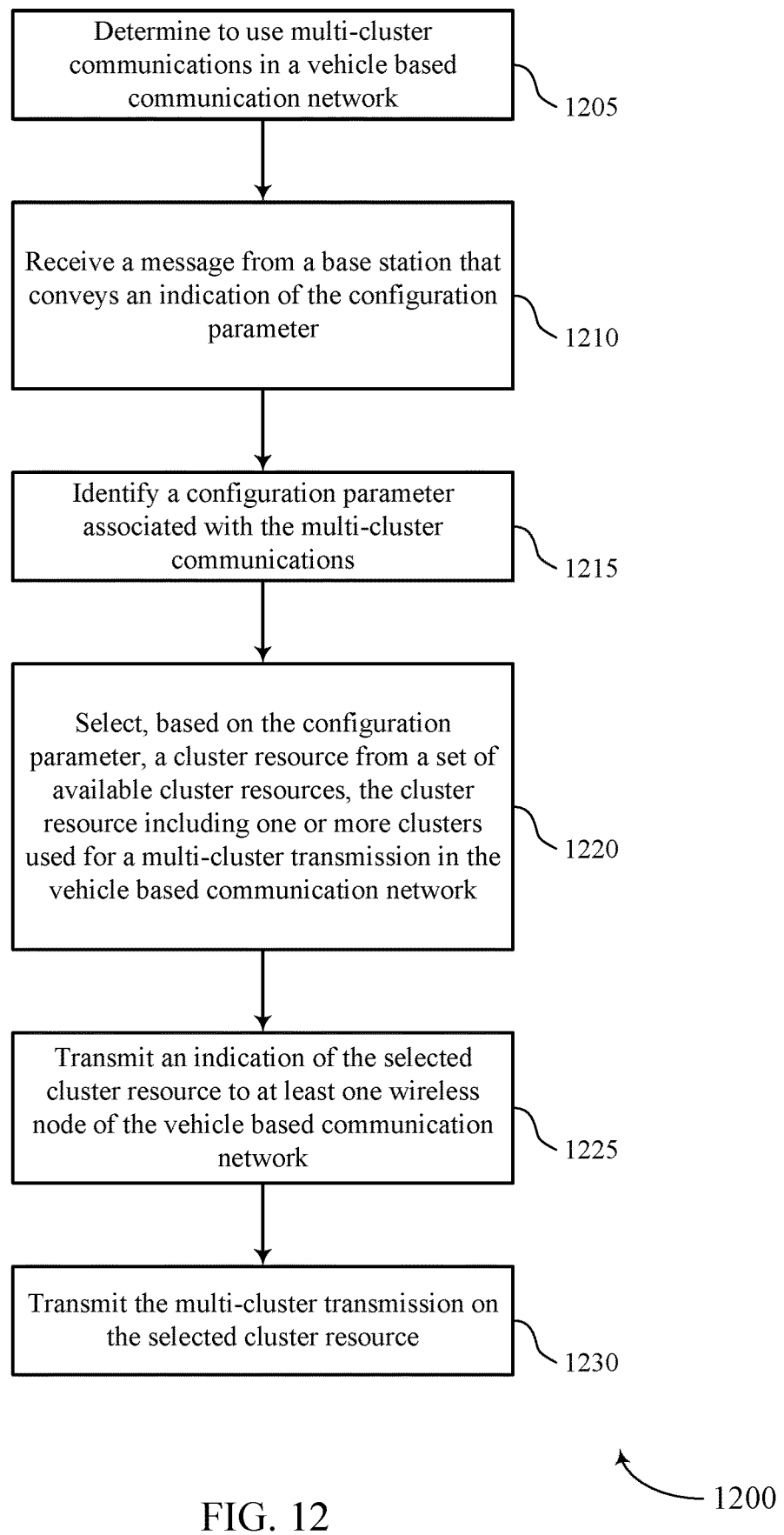

FIG. 12 shows a flowchart illustrating a method 1200 for multi-cluster transmission in accordance with various aspects of the present disclosure. The operations of method 1200 may be implemented by a UE 115 or its components as described herein. For example, the operations of method 1200 may be performed by a multi-cluster communications manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1205 the UE 115 may determine to use multi-cluster communications in a vehicle based communication network. The operations of block 1205 may be performed according to the methods as described with reference to FIGS. 1 through 5. In certain examples, aspects of the operations of block 1205 may be performed by a multi-cluster communication component as described with reference to FIGS. 6 through 9.

At block 1210 the UE 115 may receive a message from a base station that conveys an indication of the configuration parameter. The operations of block 1210 may be performed according to the methods described with reference to FIGS. 1 through 5. In certain examples, aspects of the operations of block 1210 may be performed by a configuration component as described with reference to FIGS. 6 through 9.

At block 1215 the UE 115 may identify a configuration parameter associated with the multi-cluster communications. The operations of block 1215 may be performed according to the methods as described with reference to FIGS. 1 through 5. In certain examples, aspects of the operations of block 1215 may be performed by a configuration component as described with reference to FIGS. 6 through 9.

At block 1220 the UE 115 may select, based at least in part on the configuration parameter, a cluster resource from a set of available cluster resources, the cluster resource comprising one or more clusters used for a multi-cluster transmission in the vehicle based communication network. The operations of block 1220 may be performed according to the methods as described with reference to FIGS. 1 through 5. In certain examples, aspects of the operations of block 1220 may be performed by a cluster resource component as described with reference to FIGS. 6 through 9.

At block 1225 the UE 115 may transmit an indication of the selected cluster resource to at least one wireless node of the vehicle based communication network. The operations of block 1225 may be performed according to the methods as described with reference to FIGS. 1 through 5. In certain examples, aspects of the operations of block 1225 may be performed by a transmitter as described with reference to FIGS. 6 through 9.

At block 1230 the UE 115 may transmit the multi-cluster transmission on the selected cluster resource. The operations of block 1230 may be performed according to the methods as described with reference to FIGS. 1 through 5. In certain examples, aspects of the operations of block 1230 may be performed by a transmitter as described with reference to FIGS. 6 through 9.

In some examples, aspects from two or more of the methods 1000, 1100, and 1200 as described with reference to FIGS. 10, 11, and 12 may be combined. It should be noted that the methods 1000, 1100, and 1200 are just example implementations, and that the operations of the methods 1000, 1100, and 1200 may be rearranged or otherwise modified such that other implementations are possible.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) radio frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 as described with reference to FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a transmission power requirement associated with a vehicle-based communication network when the UE is in communications with a cellular communications network;
    receiving an indication of a configuration parameter for multi-cluster communications in the vehicle-based communication network, wherein the configuration parameter is based at least in part on the identified transmission power requirement; and
    transmitting a multi-cluster transmission in a set of available cluster resources based at least in part on the configuration parameter and a received energy level associated with each available cluster resource in the set of available cluster resources, wherein the multi-cluster transmission comprises one or both of a scheduling assignment (SA) message or a data message.

2. The method of claim 1, wherein the transmission power requirement is based at least in part on a parameter obtained from a base station.

3. The method of claim 1, further comprising:
    identifying the transmission power requirement based at least in part on a location parameter of the UE when there is a failure to communicate with the cellular communications network.

4. The method of claim 1, further comprising:
    receiving a message from a base station that conveys the indication of the configuration parameter, wherein transmitting the multi-cluster transmission is based at least in part on the configuration parameter.

5. The method of claim 4, wherein the message is received during a radio resource control (RRC) setup exchange.

6. The method of claim 4, wherein the indication of the configuration parameter identifies the set of available cluster resources.

7. The method of claim 6, wherein the set of available cluster resources comprises a plurality of clusters, each cluster of the plurality of clusters comprising a common bandwidth parameter.

8. The method of claim 4, wherein the indication of the configuration parameter is received via a broadcast transmission from the base station.

9. The method of claim 1, further comprising:
    identifying the configuration parameter based at least in part on preconfigured information, wherein transmitting the multi-cluster transmission is based at least in part on the configuration parameter.

10. The method of claim 9, further comprising:
    accessing the preconfigured information based at least in part on the configuration parameter.

11. The method of claim 1, further comprising:
    ranking one or more clusters associated with the set of available cluster resources according to a received energy level associated with each cluster; and
    selecting a cluster resource from a subset of available clusters based at least in part on the ranking for each cluster, wherein the multi-cluster transmission is transmitted using the selected cluster resource.

12. The method of claim 11, wherein the ranking of each cluster is performed for a subframe.

13. The method of claim 11, further comprising:
    identifying a subset count identifying a number of clusters in the subset of available clusters being used for the multi-cluster transmission; and
    using at least one of an indication received from a base station or a preconfigured indication to select the cluster resource.

14. The method of claim 1, further comprising:
    transmitting the SA message as an indication of a cluster resource selected from a subset of available clusters, wherein the multi-cluster transmission is transmitted using the selected cluster resource; and
    transmitting the data message as the multi-cluster transmission.

15. The method of claim 14, wherein the SA message and the data message are transmitted at different transmit power levels.

16. The method of claim 15, further comprising:
    transmitting the SA message and the data message at different transmit power levels based at least in part on a parameter received from a base station during a radio resource configuration (RRC) setup procedure.

17. The method of claim 14, wherein the SA message and the data message are transmitted at a same transmit power level.

18. The method of claim 14, further comprising:
transmitting the SA message and at least a portion of the data message in a same cluster.

19. The method of claim 14, further comprising:
selecting the cluster resource for transmitting the SA message based at least in part on the configuration parameter, wherein transmitting the multi-cluster transmission is based at least in part on the configuration parameter.

20. The method of claim 14, wherein the SA message is transmitted in any cluster within the selected cluster resource.

21. An apparatus for wireless communications, comprising:
a processor;
memory in electronic communication with the processor; and
instructions stored in the memory and executable by the processor to cause the apparatus to:
identify a transmission power requirement associated with a vehicle-based communication network when the UE is in communications with a cellular communications network;
receive an indication of a configuration parameter for multi-cluster communications in the vehicle-based communication network, wherein the configuration parameter is based at least in part on the identified transmission power requirement; and
transmit a multi-cluster transmission in a set of available cluster resources based at least in part on the configuration parameter and a received energy level associated with each available cluster resource in the set of available cluster resources, wherein the multi-cluster transmission comprises one or both of a scheduling assignment (SA) message or a data message.

22. The apparatus of claim 21, wherein the transmission power requirement is based at least in part on a parameter obtained from a base station.

23. The apparatus of claim 21, wherein the instructions are further executable by the processor to:
identify a transmission power requirement based at least in part on a location parameter of the UE when there is a failure to communicate with the cellular communications network.

24. The apparatus of claim 21, wherein the instructions are further executable by the processor to:
receive a message from a base station that conveys the indication of the configuration parameter, wherein transmitting the multi-cluster transmission is based at least in part on the configuration parameter.

25. The apparatus of claim 24, wherein the indication of the configuration parameter is received via a broadcast transmission from the base station.

26. The apparatus of claim 21, wherein the instructions are further executable by the processor to:
identify the configuration parameter based at least in part on preconfigured information, wherein transmitting the multi-cluster transmission is based at least in part on the configuration parameter.

27. The apparatus of claim 21, wherein the instructions are further executable by the processor to:
rank one or more clusters associated with the set of available cluster resources according to a received energy level associated with each cluster; and
select a cluster resource from a subset of available clusters based at least in part on the ranking for each cluster, wherein the multi-cluster transmission is transmitted using the selected cluster resource.

28. The apparatus of claim 21, wherein the instructions are further executable by the processor to:
transmit the SA message as an indication of a cluster resource selected from a subset of available clusters, wherein the multi-cluster transmission is transmitted using the selected cluster resource; and
transmit the data message as the multi-cluster transmission.

29. An apparatus for wireless communication, the apparatus comprising:
means for identifying a transmission power requirement associated with a vehicle-based communication network when the UE is in communications with a cellular communications network;
means for receiving an indication of a configuration parameter for multi-cluster communications in the vehicle-based communication network, wherein the configuration parameter is based at least in part on the identified transmission power requirement; and
means for transmitting a multi-cluster transmission in a set of available cluster resources based at least in part on the configuration parameter and a received energy level associated with each available cluster resource in the set of available cluster resources, wherein the multi-cluster transmission comprises one or both of a scheduling assignment (SA) message or a data message.

30. A non-transitory computer-readable medium storing code for wireless communications, the code comprising instructions executable to:
identify a transmission power requirement associated with a vehicle-based communication network when the UE is in communications with a cellular communications network;
receive an indication of a configuration parameter for multi-cluster communications in the vehicle-based communication network, wherein the configuration parameter is based at least in part on the identified transmission power requirement; and
transmit a multi-cluster transmission in a set of available cluster resources based at least in part on the configuration parameter and a received energy level associated with each available cluster resource in the set of available cluster resources, wherein the multi-cluster transmission comprises one or both of a scheduling assignment (SA) message or a data message.

* * * * *